US008898736B2

(12) United States Patent
Jacobs

(10) Patent No.: US 8,898,736 B2
(45) Date of Patent: Nov. 25, 2014

(54) SYSTEM TO ESTABLISH TRUSTWORTHINESS OF AUTONOMOUS AGENT

(71) Applicant: Raytheon Company, Waltham, MA (US)

(72) Inventor: James L. Jacobs, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 4 days.

(21) Appl. No.: 13/662,744

(22) Filed: Oct. 29, 2012

(65) Prior Publication Data

US 2013/0111553 A1     May 2, 2013

Related U.S. Application Data

(60) Provisional application No. 61/554,238, filed on Nov. 1, 2011.

(51) Int. Cl.
| | | |
|---|---|---|
| G06F 7/04 | (2006.01) | |
| H04L 29/06 | (2006.01) | |
| G06F 21/00 | (2013.01) | |
| G06F 21/57 | (2013.01) | |

(52) U.S. Cl.
CPC ............. *G06F 21/00* (2013.01); *H04L 63/20* (2013.01); *G06F 21/57* (2013.01)
USPC .................................................. 726/3; 726/25

(58) Field of Classification Search
CPC ......... G06F 21/00; G06F 21/57; H04L 63/30; F01D 17/165; F05D 2220/40
USPC ............................................... 726/3, 25
See application file for complete search history.

(56) References Cited

U.S. PATENT DOCUMENTS

| | | | | |
|---|---|---|---|---|
| 8,046,835 | B2 * | 10/2011 | Herz | 726/25 |
| 8,261,347 | B2 * | 9/2012 | Hrabik et al. | 726/22 |
| 8,490,197 | B2 * | 7/2013 | Herz | 726/25 |
| 2003/0172368 | A1 | 9/2003 | Alumbaugh et al. | |
| 2007/0297405 | A1 | 12/2007 | He | |
| 2011/0035809 | A1 * | 2/2011 | Fisher | 726/27 |
| 2011/0145919 | A1 * | 6/2011 | Whelihan et al. | 726/22 |

OTHER PUBLICATIONS

Dougas E. Bernard, "Design of the Remote Agent Experiment for Spacecraft Autonomy", Aerospace Conference, 1998 IEEE, vol. 2.*
Andrew S. Patrick, National Research Council of Canada, "Building Trustworthy Software Agents", IEEE 2002.*

(Continued)

*Primary Examiner* — Samson Lemma
(74) *Attorney, Agent, or Firm* — Cantor Colburn LLP

(57) ABSTRACT

A system to establish a trustworthiness of an autonomous agent is provided. The system includes a plurality of computing devices disposed in signal communication with one another via a network, at least one of the plurality of the computing devices being configured to serve as a host server for an autonomous agent trustworthiness establishing (AATE) application. The AATE application is configured to define a micro-theory of trust elements, apply trust building patterns to the autonomous agent, provide a visualization of autonomous agent skill claims and constraints via the network and provide a recommendation tracking system for sharing and tracking a reputation of the autonomous agent during testing and deployment via the network.

15 Claims, 5 Drawing Sheets

(56) References Cited

OTHER PUBLICATIONS

Abdul Rahman et al., "Supporting Trust in Virtual Communities" [online]. In: Proceedings of the 33rd Annual Hawaii International Conference on System Sciences, Jan. 4-7, 2000. [Retrieved on Dec. 14, 2012] from Internet, URL: http://reference.kfupm.edu.sa/content/s/u/supporting_trust_in_virtual_communities_33791.pdf.; 11 pages.

Jacobs, Jim, "Delegation Management." [online]. Published Jul. 2011. Retrieved on Dec. 14, 2012, from URL: http://www.dtic.mil.dtic/tr/fulltext/u2/a545748.pdf., 22 pages.

Notification of Transmittal of the International Search Report and the Written Opinion of the International Searching Authority, or the Declaration; International Application No. PCT/US12/62401; International Filing Date; Oct. 29, 2012; Date of Mailing Jan. 23, 2013, 9 pages.

Seymour, R., "A Trust-Based Multiagent System" [online]. In International Conference on Computational Science and Engineering, Aug. 29-31, 2009, pp. 109-116. [Retrieved on Dec. 15, 2012, from the Internet, URL: http://robobrarian.info/b_pubs/PASSAT09-Seymour.pdf. entire document.

Written Opinion of the International Searching Authority for Internatinal Application No. PCT/US12/62401; International Filing Date: Oct. 29, 2012; Date of Mailing Jan. 23, 2013; Applicant; Raytheon Company, 4 pages.

\* cited by examiner

SYSTEM TO ESTABLISH TRUSTWORTHINESS OF AUTONOMOUS AGENT

CROSS-REFERENCE TO RELATED APPLICATION

This application is a non-provisional application that claims the benefit of priority to U.S. provisional application No. 61/554,238, which was filed on Nov. 1, 2011. The entire contents of U.S. provisional application No. 61/554,238 are incorporated herein by reference.

BACKGROUND

The subject matter disclosed herein relates to a system to establish the trustworthiness of an autonomous agent and, more particularly, to a system to establish the trustworthiness of an autonomous agent by applying human patterns of trust building.

A significant barrier to more extensive use of autonomous agents is not the capability set, the features, the cost or the level of technological maturity of the autonomous agents, but rather the lack of trustworthiness of the autonomous agents. This trustworthiness problem at least partially stems from the fact that establishing the trustworthiness of autonomous agents has not generally been attempted and, even if attempts have been made, they have not been based on methods of establishing trust among humans. That is, current approaches fail to recognize trust and fail to use formal models of the trust and trust building relationships.

For example, over the past decade, the use of RPVs has become an essential part of US military strategy. In operation, RPVs are typically given "sliding autonomy" to operate with limited operator control where an autonomous agent controlling the RPV is allowed to function unless or until the operator feels he must take control. In practice, however, this scheme devolves to simple tele-operation since the operator(s) have no way to determine whether the RPVs can successfully operate autonomously and, thus, cannot trust the relevant autonomous agent to operate properly. In another technique, exhaustive tests of autonomous agents are performed during development stages. Such tests can identify and correct bugs in the autonomous agent but are useless in an operational environment where unanticipated stimuli are encountered and it is discovered that the autonomous agent cannot respond properly. A third approach is to deploy the autonomous agent and attempt to discern trustworthiness in particular situations by collecting trouble reports and making patches, if possible, on the fly.

In 2001, Congress approved a military doctrinal statement that set an aggressive goal for autonomous agents. That statement set forth that, by 2015, one-third of combat vehicles are to be autonomous. As of 2011, the reality has been that despite increasing UAV/RPV use, only limited autonomy (e.g. flight/navigation) is actually deployed.

SUMMARY

According to one aspect of the invention, a system to establish a trustworthiness of an autonomous agent is provided. The system includes a plurality of computing devices disposed in signal communication with one another via a network, at least one of the plurality of the computing devices being configured to serve as a host server for an autonomous agent trustworthiness establishing (AATE) application. The AATE application is configured to define a micro-theory of trust elements, apply trust building patterns to the autonomous agent, provide a visualization of autonomous agent skill claims and constraints via the network and provide a recommendation tracking system for sharing and tracking a reputation of the autonomous agent during testing and deployment via the network.

According to another aspect of the invention, a method for establishing trustworthiness of an autonomous agent is provided. The method includes disposing a plurality of computing devices disposed in signal communication with one another via a network, at least one of the plurality of the computing devices being configured to serve as a host server for an autonomous agent trustworthiness establishing (AATE) application. The AATE application is configured to define a micro-theory of trust elements, apply trust building patterns to the autonomous agent, provide a visualization of autonomous agent skill claims and constraints via the network and provide a recommendation tracking system for sharing and tracking a reputation of the autonomous agent during testing and deployment via the network.

According to yet another aspect of the invention, a computer program product is provided and includes a tangible storage medium readable by a processing circuit and on which instructions are stored for execution by the processing circuit for performing a method. The method is for establishing trustworthiness of an autonomous agent and includes disposing a plurality of computing devices disposed in signal communication with one another via a network, at least one of the plurality of the computing devices being configured to serve as a host server for an autonomous agent trustworthiness establishing (AATE) application. The AATE application is configured to define a micro-theory of trust elements, apply trust building patterns to the autonomous agent, provide a visualization of autonomous agent skill claims and constraints via the network and provide a recommendation tracking system for sharing and tracking a reputation of the autonomous agent during testing and deployment via the network.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
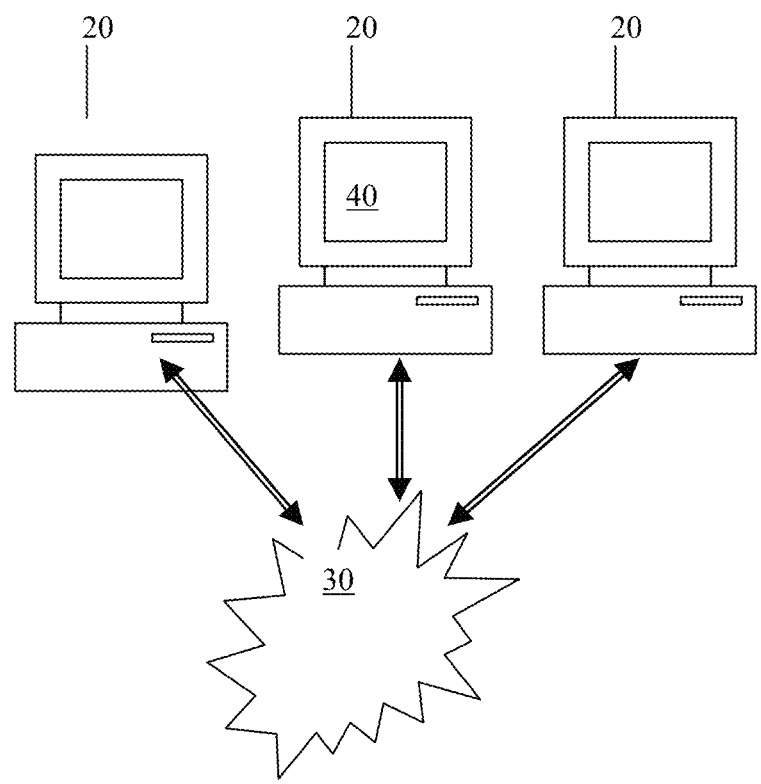
FIG. 1 is a schematic diagram of a system to establish a trustworthiness of an autonomous agent.

The detailed description explains embodiments of the invention, together with advantages and features, by way of example with reference to the drawings.

DETAILED DESCRIPTION

According to software development terminology, an autonomous agent is a software based application that acts as a proxy for a human operator of, for example, a piece of hardware that is designed to operate remotely and without human control. An example of an autonomous agent may be artificially constructed software that is capable of autonomous actions on behalf of a user to control an operation of an unmanned aerial vehicle (UAV). Currently, such autonomous agents are rarely if ever employed and, instead, UAVs, remotely piloted vehicles (RPVs) and other similar devices tend to be controlled by teams of operators at most if not all times while in operation.

In accordance with aspects, a software capability that makes the elements of trust explicit has been provided. For humans, trust is made explicit by specifying a context and a set of possible actions. We trust someone to obey the law in general, but not necessarily to obey the speed limit in all cases. For an autonomous agent, however, operators need to be provided with the tools needed to let them trust the autonomous agent to do its job. That is, the autonomous agent must have the right capabilities and be able to show ahead of time that it can be trusted to apply those capabilities correctly in a current situation.

For humans, the journey from novice to trusted expert is accompanied by testing, which leads to various informal and formal certifications, experience which leads to records of acceptable performance in specific contexts, and recommendations from current experts who can testify to the person's skill level. It is thus, proposed that a similar process be performed for an autonomous agent. This process includes construction and application of a semantic model of trust, such as a micro-theory of trust, which can be used to track assertions of competence and trustworthiness. By making such assertions explicit and inspectable, operators will be able to judge the competence of an autonomous agent in a manner similar to the way they evaluate human actors in similar roles.

Currently, autonomous agents are constructed and evaluated much the same as other kinds of software applications. The verification and validation test approaches are usually identical, and the testing batteries are essential the same. The problem is that we expect, and ask operators to accept, that autonomous agents will operate with human-like levels of intelligence and ability. This means dealing with complex situations and highly dynamic environments. Rather than try to anticipate all possible scenarios and test new agents against them, it is proposed that autonomous agents be provided with the ability to model key components of trust-building. That is, they should be able to illustrate and visualize certified skills, past performance and references from past associates (i.e., humans who have worked with the agents before and can testify to their abilities on tasks).

To this end, with reference to FIG. 1 and in accordance with embodiments, a system 10 and method are provided to establish a trustworthiness of an autonomous agent. The system 10 includes a plurality of computing devices 20 disposed in signal communication with one another via a network 30. Each computing device 20 includes a tangible storage medium readable by a processing circuit and on which instructions are stored for execution by the processing circuit for performing the methods described below. At least one of the plurality of the computing devices 20 is configured to serve as a host server for an autonomous agent trustworthiness establishing (AATE) application 40. The AATE application 40 is configured to define a micro-theory of trust elements, apply trust building patterns to the autonomous agent, provide a visualization of autonomous agent skill claims and constraints via the network and provide a recommendation tracking system for sharing and tracking a reputation of the autonomous agent during testing and deployment via the network.

Figure 2:
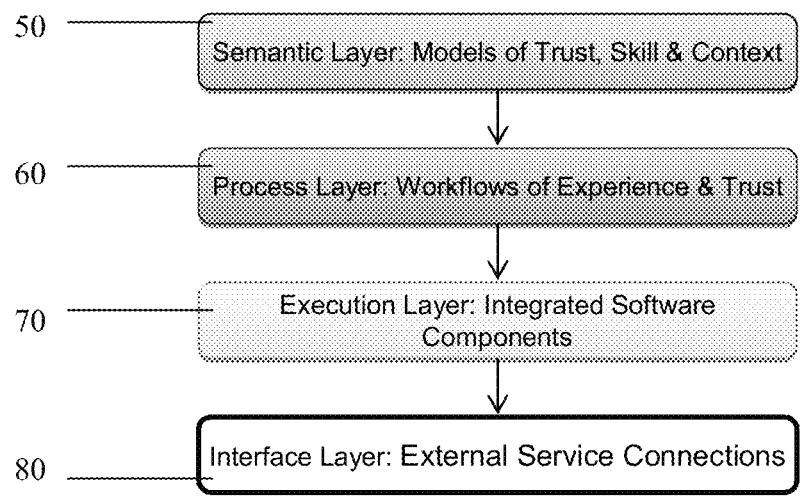
FIG. 2 is a hierarchical diagram of the algorithmic layers of the system of FIG. 1.

With reference to FIG. 2, defining the micro-theory of trust elements may include generating a robust foundational ontology at a top hierarchical layer 50 that supports the sharing of semantic models of autonomous agents, goals and other key concepts. In addition, at next sequential hierarchical process and execution layers 60 and 70, workflows of experience and trust may be handled and software components may be integrated. That is, the applying of human patterns of trust-building to autonomous agents may include building a web-services tool for attaching certificates to human-authored assertions of agent skills and capabilities and other trust-related assertions via the network 30 and providing a lightweight web-based visualization of autonomous agent skill claims and stated constraints on its acceptable use contexts via the network 30. Finally, at an interface layer at a bottom hierarchical layer 80, a recommendation tracking system is provided. Such a recommendation tracking system may be analogous to that used by social networking services to share and would be configured to track the reputation of autonomous agents through-out their testing and deployment phases.

This approach relies in part on the participation of trusted human reviewers and recommenders. Social networks provide some reputation management systems, but they will require participation of developers and operators who will interact with and manage autonomous agents. In this regard, a mission experience library and other user communities may be provided as a resource.

Figure 3:
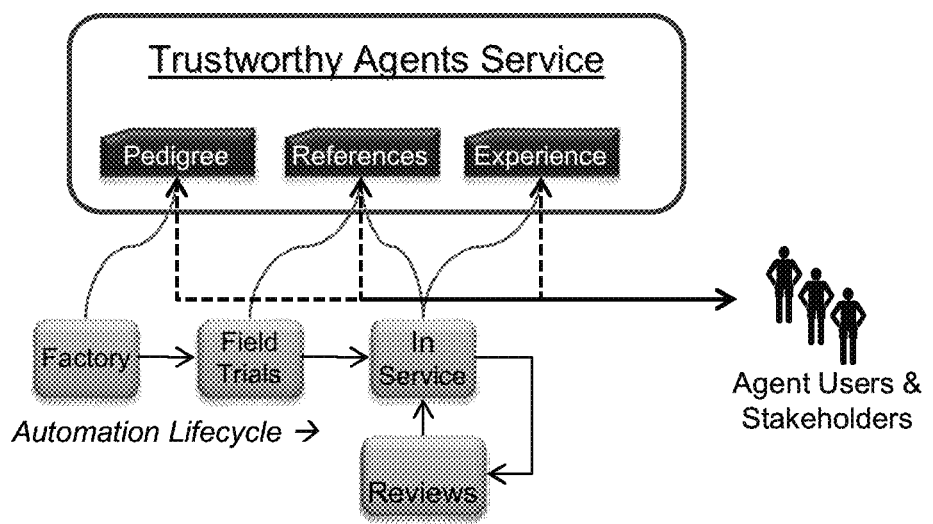
FIG. 3 is a schematic diagram illustrating a lifecycle of an autonomous agent to which the system of FIG. 1 applies.
Figure 4:
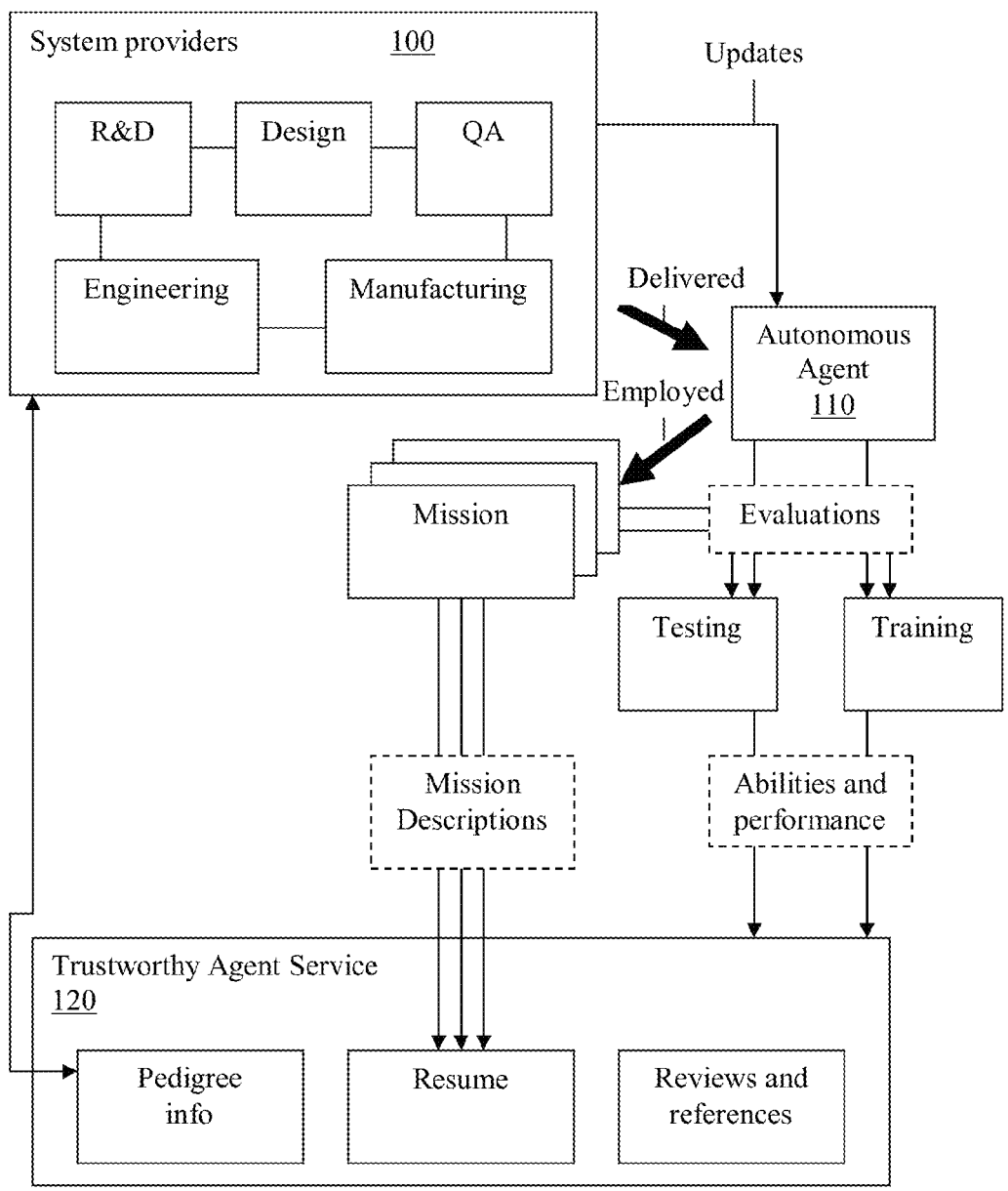
FIG. 4 is a schematic diagram of an operation of the system of FIG. 1.

With reference to FIGS. 3 and 4, with the system 10 provided as described above, an operation of the system 10 over the lifecycle of an autonomous agent is illustrated. At least initially, system providers 100, such as research and development personnel, design personnel, quality assurance personnel, engineer and manufacturing teams generate a first iteration of an autonomous agent as well as pedigree information, such as design, test and construction information. The autonomous agent is then delivered as an autonomous agent 110 to testing personnel and training personnel for evaluations. These evaluations can be used to determine the abilities and performance level of the autonomous agent 110 and are inputted to the trustworthy agent service 120. In addition, once the testing and training of the autonomous agent 110 is complete, the autonomous agent 110 may be employed in certain missions. The mission descriptions as well as mission evaluations are inputted to the trustworthy agent service 120 as resume information that pertains to the actual use, reviews and acquired qualifications of the autonomous agent. Finally, the pedigree information is delivered to the trustworthy agent service 120 while all the reviews and references of the evaluators, system providers 100 and operators are delivered to the trustworthy agent service 120 as reviews and references that can be judged on their own merits independently by later reviewers.

As shown in FIGS. 3 and 4, the reviews and references can be fed back to the system providers 100 as part of a feed back loop to gradually improve the autonomous agent, to provide the autonomous agent with the necessary tools to improve performance and to allow it build the trust of the human operators using the autonomous agent. Moreover, as the pedigree and resume information gradually increase in size and detail, it is seen that operators will eventually exhibit a substantially increased "willingness to try" metric with respect to the autonomous agent versus an agent having only resume information or only pedigree information and a control agent having neither pedigree nor resume information.

Figure 5:
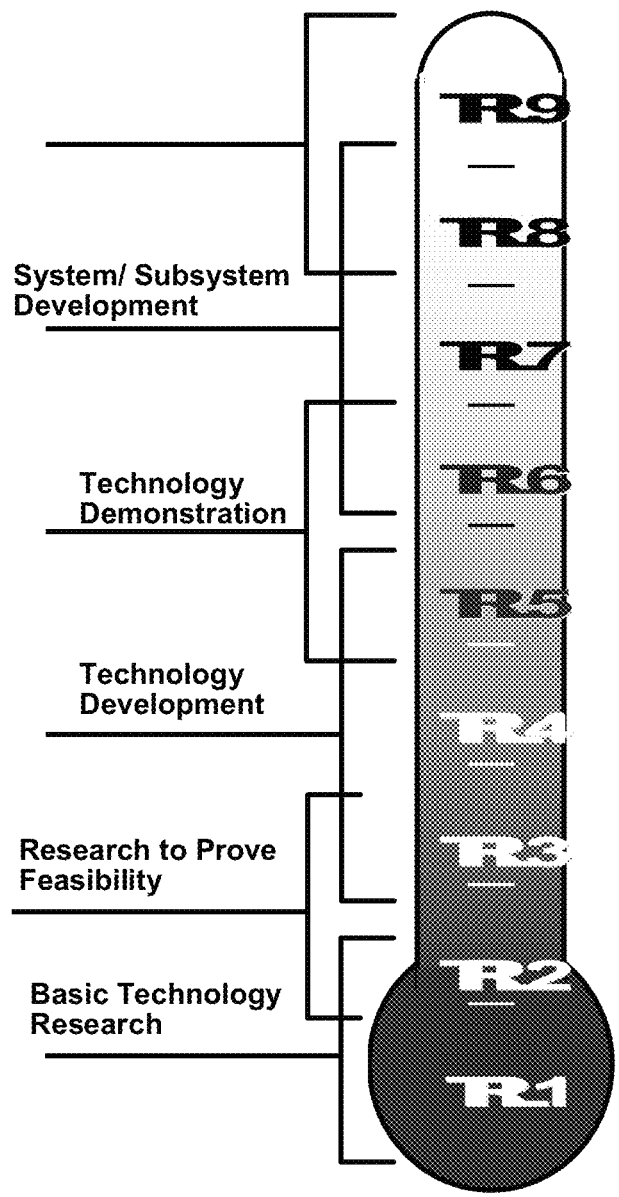
FIG. 5 illustrates technology readiness levels (TRLs) of the autonomous agent.

Thus, with reference to FIG. 5, the software technology readiness level (TRL) of the autonomous agent may steadily improve. As shown, at TRL 1, basic principles are observed and reported. These include basic properties of algorithms, representations and concepts, mathematical formulations and a mix of basic and applied research. Scientific research begins to be translated into applied research and development. At TRL 2, a technology concept and/or application is formulated. At this point, basic principles are coded and experiments with synthetic data are performed. Once basic principles are observed, practical applications can follow. At this point, the usefulness of the autonomous agent may be speculative and there is no proof or detailed analysis to support the assumption.

In the technology development stage, at TRL 3, analytical and experimental critical function and/or characteristic proof-of-concept are performed with generally limited functionality implementations and relatively small representative data sets. Still, scientific feasibility may be fully demonstrated and active research and development may be initiated. Such research and development may include analytical studies and laboratory studies to physically validate analytical predictions of separate elements of the technology. At TRL 4, module and/or subsystem validation in a lab environment (i.e. software prototype dev environment) is performed with standalone prototype implementations. Experiments may be conducted with full scale problems or data sets. Basic technological components are integrated to establish that the pieces will work together. At TRL 5, module and/or subsystem validation in a relevant environment is performed with prototype implementations conforming to target environments and/or interfaces. At TRL 6, module and/or subsystem validation in a relevant end-to-end environment is conducted with prototype implementations on full scale realistic problems and at least partially integration with existing hardware/software systems.

In the system/subsystem development stage, at TRL 7, system prototype demonstration in an operational high-fidelity environment is performed. At this point, most functionality is available for demonstration and test and is integrated with operational hardware/software systems while most of the software bugs are removed. At TRL 8, an actual autonomous agent system may be completed or nearly completed and mission qualified through test and demonstration in an operational environment. Here, the software is thoroughly debugged and fully integrated with operational hardware and software systems. Most of the user documentation, training documentation and maintenance documentation is completed. All functionality is tested in simulated and operational scenarios and verification and validation are completed. At TRL 8, the technology has been proven to work in its final form and under expected conditions. In almost all cases, TRL 8 represents the end of true system development.

In the system test, launch and mission operations stage, at TRL 9, the actual autonomous agent system is proven and fully demonstrated through successful mission-proven operational capabilities. The thoroughly debugged software is readily repeatable and fully integrated with operational hardware/software systems. All documentation is completed and successful operational experience is exhibited. Sustaining software engineering support is in place.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system to establish a trustworthiness of an autonomous agent, the system comprising:
   a plurality of computing devices disposed in signal communication with one another via a network;
   at least one of the plurality of the computing devices being configured to serve as a host server for an autonomous agent trustworthiness establishing (AATE) application where the autonomous agent comprises a proxy for a human operator of hardware designed to operate remotely and without human control, the AATE application being configured to:
   define a micro-theory of trust elements,
   apply trust building patterns to the autonomous agent,
   provide a visualization of autonomous agent skill claims and constraints via the network,
   provide a recommendation tracking system for sharing and tracking a reputation of the autonomous agent during testing and deployment via the network and for providing review and reference information for the autonomous agent, and
   feed-back the review and reference information for autonomous agent improvement and to build human operator trust.

2. The system according to claim 1, wherein defining the micro-theory of trust elements comprises defining a foundational ontology supportive of a sharing of semantic models of the autonomous agent and goals.

3. The system according to claim 1, wherein applying trust building patterns comprises building a web-services tool for attaching certificates to at least the skill claims.

4. The system according to claim 1, wherein the recommendation tracking system further provides pedigree and resume information along with the review and reference information for the autonomous agent.

5. The system according to claim 4, wherein the pedigree information comprises design, test and construction information of the autonomous agent.

6. The system according to claim 4, wherein the resume information pertains to actual use, reviews and acquired qualifications of the autonomous agent.

7. A method for establishing trustworthiness of an autonomous agent, the method comprising:
   disposing a plurality of computing devices disposed in signal communication with one another via a network;
   at least one of the plurality of the computing devices being configured to serve as a host server for an autonomous agent trustworthiness establishing (AATE) application where the autonomous agent comprises a proxy for a human operator of hardware designed to operate remotely and without human control, the AATE application being configured to:
   define a micro-theory of trust elements,
   apply trust building patterns to the autonomous agent,
   provide a visualization of autonomous agent skill claims and constraints via the network,
   provide a recommendation tracking system for sharing and tracking a reputation of the autonomous agent during testing and deployment via the network and for providing review and reference information for the autonomous agent, and feed-back the review and reference information for autonomous agent improvement and to build human operator trust.

8. The method according to claim 7, wherein defining the micro-theory of trust elements comprises defining a foundational ontology supportive of a sharing of semantic models of the autonomous agent and goals.

9. The method according to claim 7, wherein applying trust building patterns comprises building a web-services tool for attaching certificates to at least the skill claims.

10. The method according to claim 7, wherein the recommendation tracking system further provides pedigree and resume information along with the review and reference information for the autonomous agent.

11. The method according to claim 10, wherein the pedigree information comprises design, test and construction information of the autonomous agent.

12. The method according to claim 10, wherein the resume information pertains to actual use, reviews and acquired qualifications of the autonomous agent.

13. A computer program product comprising a non-transitory tangible storage medium readable by a processing circuit and on which instructions are stored for execution by the processing circuit for performing a method for establishing trustworthiness of an autonomous agent, the method comprising:

disposing a plurality of computing devices disposed in signal communication with one another via a network;

at least one of the plurality of the computing devices being configured to serve as a host server for an autonomous agent trustworthiness establishing (AATE) application where the autonomous agent comprises a proxy for a human operator of hardware designed to operate remotely and without human control, the AATE application being configured to:

define a micro-theory of trust elements by generation of a robust foundational ontology supportive of model and goal sharing, the micro-theory of trust elements being usable to track assertions of competence and trustworthiness of the autonomous agent, apply trust building patterns to the autonomous agent by way of a web-services tool for attaching certificates to human-authored assertions of autonomous agent skills and capabilities, provide a visualization of autonomous agent skill claims and constraints on acceptable use contexts of the autonomous agent via the network, provide a recommendation tracking system for sharing and tracking a reputation of the autonomous agent during testing and deployment via the network, wherein the recommendation tracking system further provides pedigree, resume, review and reference information for the autonomous agent, and feed-back the review and reference information for autonomous agent improvement and to build human operator trust.

14. The computer program product according to claim 13, wherein the pedigree information comprises design, test and construction information of the autonomous agent.

15. The computer program product according to claim 13, wherein the resume information pertains to actual use, reviews and acquired qualifications of the autonomous agent.

* * * * *